(12) United States Patent
Naor et al.

(10) Patent No.: US 6,275,573 B1
(45) Date of Patent: Aug. 14, 2001

(54) SYSTEM AND METHOD FOR SECURED NETWORK ACCESS

(75) Inventors: Uri Naor, Ramat Gan; Shimon Zigdon; Tsion Gonen, both of Netanya, all of (IL)

(73) Assignee: Snapshield Ltd., Tel Aviv (IL)

( * ) Notice: Subject to any disclaimer, the term of this patent is extended or adjusted under 35 U.S.C. 154(b) by 0 days.

(21) Appl. No.: 09/089,156

(22) Filed: Jun. 2, 1998

(51) Int. Cl.[7] .............................. H04M 1/68; H04M 3/42; H04K 1/00; H04L 9/00
(52) U.S. Cl. .................... 379/194; 379/161; 379/195; 379/201; 379/207; 380/257
(58) Field of Search .................................. 379/161, 188, 379/194, 196, 197, 198, 201, 207, 219, 195; 380/9, 33, 257

(56) References Cited

U.S. PATENT DOCUMENTS

| | | | |
|---|---|---|---|
| 5,392,357 | * 2/1995 | Bulfer et al. | 379/207 X |
| 5,434,920 | 7/1995 | Cox et al. | 380/257 |
| 5,455,861 | 10/1995 | Faucher et al. | 380/266 |
| 5,594,798 | 1/1997 | Cox et al. | 380/257 |

* cited by examiner

*Primary Examiner*—Harry S. Hong
(74) *Attorney, Agent, or Firm*—Eithan, Pearl, Latzer & Cohen-Zedek

(57) ABSTRACT

Secured connections are provided over a telephone access network using encryption/decryption equipment installed at a customer's premises and at a network facility. For outbound calls, the access network is secured before the destination number or any other critical information is sent over the access network. Inbound calls are routed through a secure center to prevent the identification of the calling party and to secure these communications over the access network. By providing encryption/decryption equipment at the network facility, the system provides secured connections over the access network regardless of whether the remote party is secured. The system also may be configured to provide end-to-end secured connections.

8 Claims, 12 Drawing Sheets

SYSTEM AND METHOD FOR SECURED NETWORK ACCESS

FIELD OF THE INVENTION

The present invention relates to communications systems and, more specifically, to a system and method for providing secured communications over the telephone network.

BACKGROUND OF THE INVENTION

The telephone network (commonly referred to as the public switched telephone network or "PSTN") consists of a vast network of interconnected telephone switching facilities. Typically, telephone equipment such as a telephone, a fax machine or a modem connects to the PSTN via a telephone facility referred to as the local exchange or central office ("CO"). Each CO, in turn, connects to one or more switching facilities in the PSTN. Through this arrangement, telephone equipment may place a call that is routed through a CO, through the network, through another CO and, finally, to other telephone equipment.

The portion of the network between the local exchange and customer premises equipment (e.g., telephone equipment installed, for example, at a customer's residence or place of business) is known as the access network (e.g., a local loop). The access network typically consists of copper wires, fiber optic cable, coaxial cable or a combination of these or other components. These components may carry analog signals or digital signals, either of which may be used on different portions of the same access network. When an access network includes both analog and digital portions, the digital portion of the access network may terminate in a connection box located outside of the customer's premises. Copper wire pairs run from the connection box, through the customer premises (e.g., the telephone customers building), to the customer premises equipment ("CPE").

In general, it may be relatively difficult to eavesdrop on a given customer's communications outside of the access network. The PSTN trunks that connect the CO to other switching equipment typically carry multiplexed digital signals. Here, a single trunk (e.g., a copper wire or a fiber optical cable) simultaneously passes the signals for a large number of calls. Thus, it is more difficult for an eavesdropper to determine which trunks in the CO and the PSTN are transmitting a specific customer's communications. Moreover, it may be relatively difficult for an eavesdropper to extract these signals in the event the eavesdropper is successful in identifying the customer's trunk.

In contrast, the access network is more susceptible to eavesdropping. Given the route of the access network through public spaces, eavesdroppers may have relatively easy access to a customer's access network at some point along its route to the CO. Thus, it may be relatively easy to identify an access network of a specific customer and tap the wire. In particular, the portion of the access network that runs over copper wires outside of the customer's premises is especially susceptible to eavesdropping.

Some conventional systems use encryption devices in an attempt to provide secured communications over telephone networks. Typically, an encryption/decryption device is connected to the telephone equipment at each end of the call. For example, signals from a telephone at one end of a call are routed to one of these devices, encrypted, then sent to the PSTN. The encrypted signals are routed through the PSTN and, eventually, to another device. That device decrypts the signals and provides the decrypted signals to the telephone at the other end of the call.

Systems such as the one just described have a several drawbacks. For example, both customers must have the encryption/decryption equipment. This requires the parties to set up the system ahead of time. Thus, these systems are not very cost effective except for parties that make a relatively large number of calls to one another. In addition, in some of these systems, the callers must manually establish the secured connection after calling the other party. This may be cumbersome and may enable eavesdroppers to determine the telephone number of the called party or the calling party with relative ease. Moreover, in many of these systems, calls to destinations that do not have the encryption/decryption equipment are unsecured. In view of these and other drawbacks, a need exists for a more effective method of providing secured communications over telephone networks.

SUMMARY OF THE INVENTION

A system constructed according to the invention provides secured communications between customer premises equipment and a switching node in the network such as a local exchange. Communications from a subscriber's equipment are encrypted before they are sent over the access network. These communications are decrypted by equipment installed at the network node. Communications to the subscriber are encrypted at the network node and then decrypted on the subscriber's side of the access network.

In an embodiment where only one of the parties taking part in a call is subscriber, communications are secured only between the subscriber's CPE and the equipment at the network node. For example, an encryption/decryption unit is installed between the subscriber's CPE and the subscriber's side of the access network. Another encryption/decryption unit is installed at the CO that provides telephone service for the subscriber. In this case, the system does not encrypt the subscriber's communications in the rest of the network. As a result, the subscriber can communicate with remote, unsecured equipment yet still have secured communications over the subscriber's access network.

In an embodiment where more than one of the parties taking part in a call is a subscriber, communications may be secured between each of the subscriber's CPE. In this case, an encryption/decryption unit is installed between each of the subscribers' CPE and that subscribers' side of the access network. In addition, an encryption/decryption unit is installed at some node in the network (e.g., at a CO). The communications from each subscriber are routed through the encryption/decryption unit at the network node. In this manner, the system provides end-to-end secured communications between each of the subscribers.

In one embodiment, the encryption/decryption equipment installed in the network is a multi-line encryption/decryption center that is connected to a switch in the telephone network via digital interfaces (e.g., E1, T1, ISDN). Calls through the network that need to be decrypted or encrypted are routed through the encryption/decryption center then back to the network. This embodiment uses computer telephony integration ("CTI") technology to provide a system that is relatively easy to customize and upgrade.

In summary, the system secures the communications over the most susceptible part of the network: the subscriber's access network. Moreover, the system secures the communications over the subscriber's access network even when one of the participants in a call does not have encryption/decryption equipment.

Significantly, the system secures the call before any important information is sent over the access network. This is accomplished by establishing a secure connection over the subscriber's access network before establishing the telephone connection to the called party. As a result, the system can encrypt the phone destination number dialed by the calling party before it sends this number over the access network. In addition, the system can encrypt automatic number identification information the system receives from a party calling the subscriber. That is, the telephone number of the calling party may be encrypted before it is sent over the access network.

A system constructed according to the invention may be more cost effective than conventional systems because the system may be configured so that a relatively small bank of network-based encryption/decryption units handle calls from a relatively large number of subscribers. In this case, the ratio of encryption/decryption units to subscribers may be based on statistical analysis of secured call traffic usage.

BRIEF DESCRIPTION OF THE DRAWINGS

These and other features of the invention will become apparent from the following description and claims, when taken with the accompanying drawings, wherein similar references characters refer to similar elements throughout and in which:

DESCRIPTION OF EXEMPLARY EMBODIMENTS

Figure 1:
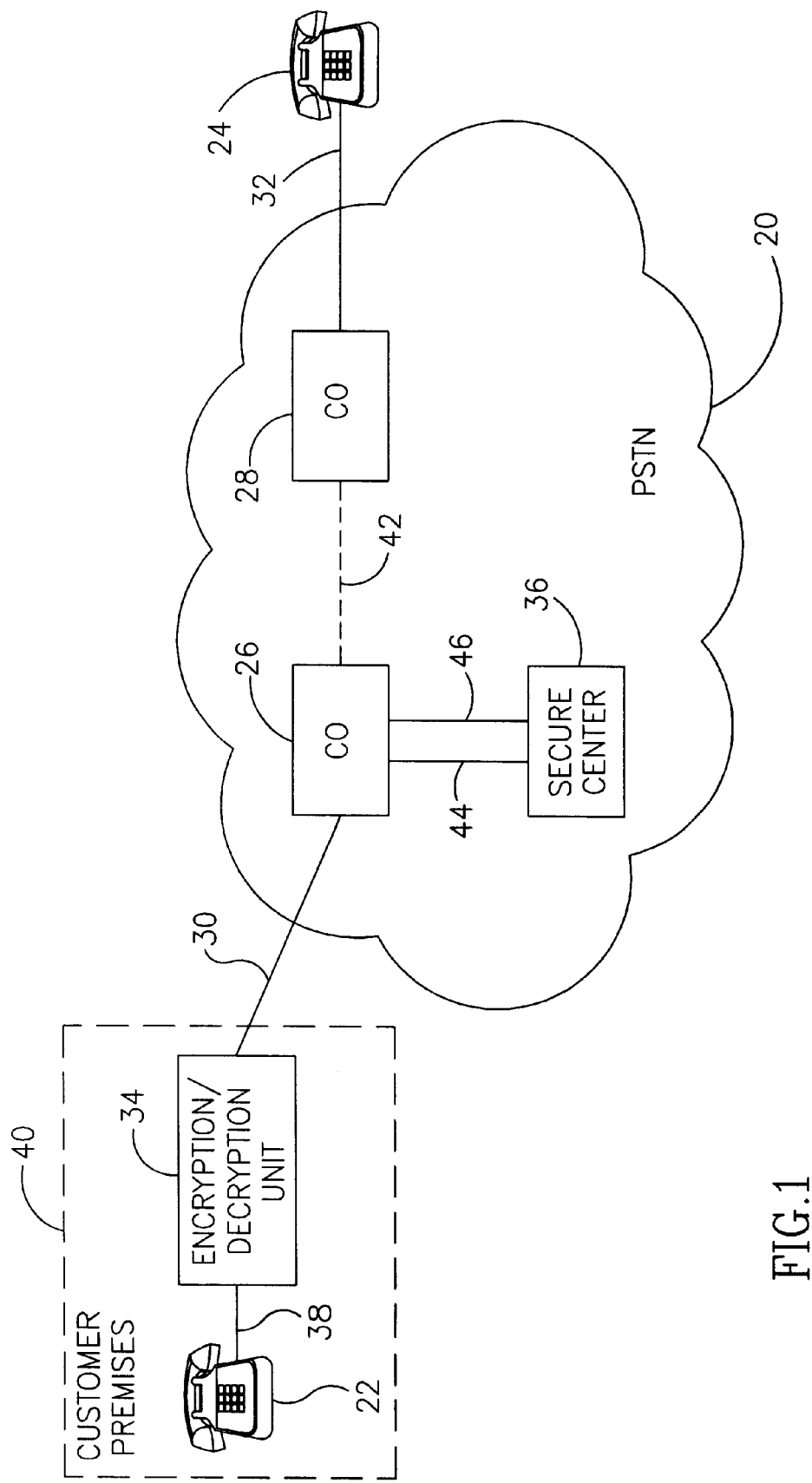
FIG. 1 is a block diagram of a telephone network incorporating one embodiment of a network encryption/decryption system constructed according to the invention.

FIG. 1 illustrates a communication system S including several telephones 22 and 24 that communicate via a public switched telephone network 20. Each telephone 22 and 24 connects to a CO 26 and 28 in the network 20 over a corresponding access network 30 and 32.

In accordance with one embodiment of the invention, an encryption/decryption unit 34 installed in a customer's premises 40 cooperates with a secure center 36 installed in the network 20 to provide secured connections over the access network 30. A call to and from the telephone 22 is established through the encryption/decryption unit 34 and the secure center 36. Once a call is established, outbound signals (i.e., signals from the telephone 22 to the telephone 24) are routed through the encryption/decryption unit 34 via the line 38. The encryption/decryption unit 34 encrypts these signals and sends them to the secure center 36 via the access network 30 and switching equipment in the CO 26. The CO switching equipment sends the signals over the line 44 to an inbound port of the secure center 36. Typically, the secure center 36 is located in the same building as the CO switching equipment.

The secure center 36 decrypts the encrypted signals and sends them over the existing access network to the telephone 24. The signals are routed from an output port of the secure center 36, over the line 46 and to the CO switching equipment. The CO 26 routes the decrypted signal to another CO 28 in the network 20. As represented by dashed line 42, the call may be established through other switching equipment (not shown) in the network 20. After the decrypted signal reaches the CO 28, the CO 28 sends the signal to the telephone 24 over the access network 32.

Inbound signals (i.e., signals sent from the telephone 24 to the telephone 22) are initially routed through the secure center 36 via the CO 26. The secure center 36 encrypts these signals, then sends them over the access network 30 to the encryption/decryption unit 34. The encryption/decryption unit 34 decrypts the signals and sends the decrypted signals to the telephone 22.

For either inbound or outbound calls, the system establishes two telephone connections for each call: one connection between the telephone 22 and the secure center 36 and the other connection between the secure center 36 and the telephone 24. In general, the subscribers will not notice any difference between the secured calls provided by the system and calls made without the secured system.

Figure 2:
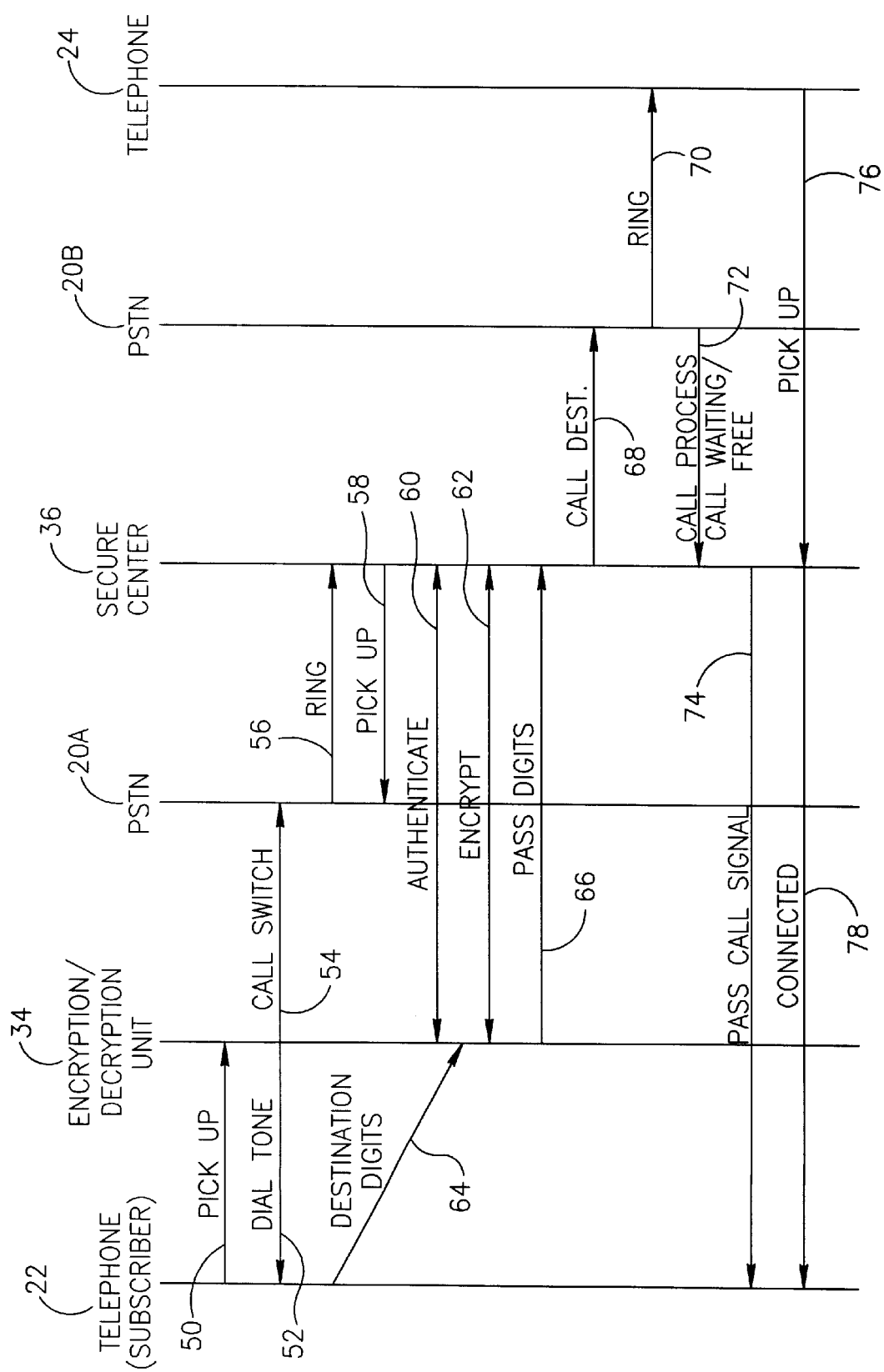
FIG. 2 is a diagram of a call setup procedure for an outgoing secured call (e.g., a call originating from a secured subscriber) according to one embodiment of the invention.
Figure 3:
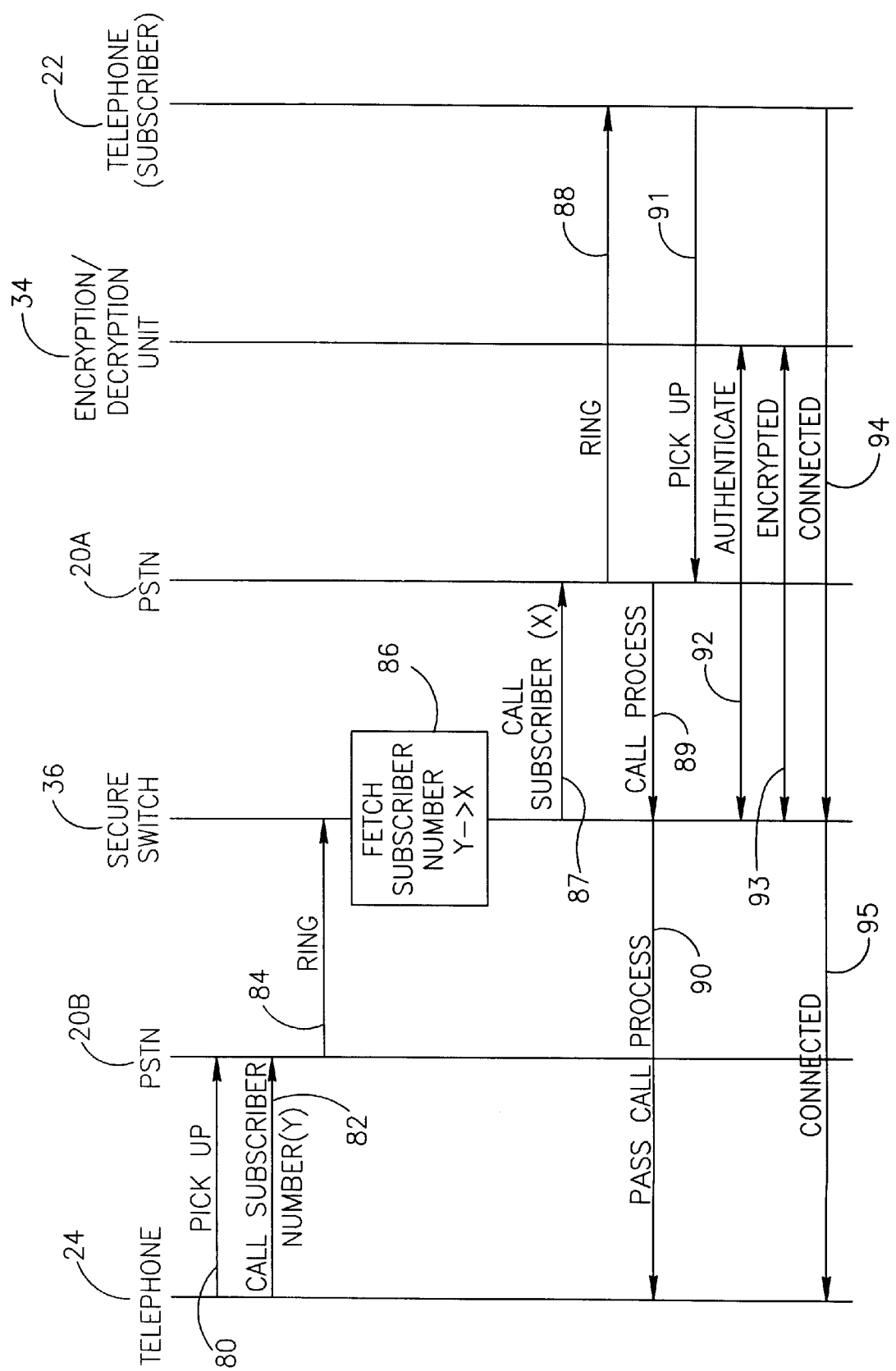
FIG. 3 is a diagram of a call setup procedure for an incoming secured call (e.g., a call placed to a secured subscriber) according to one embodiment of the invention.

The call setup procedures for an outbound call and an inbound call are described in FIGS. 2 and 3, respectively. The entities in the system S are represented by the vertical lines as indicated. The two boundaries of the PSTN 20 (access network 30 side and access network 32 side) are represented as PSTN 20A and PSTN 20B, respectively. The call procedures are represented in a vertical time line fashion with subsequent operations represented at successively lower levels in the diagram.

FIG. 2 is a diagram of a call setup procedure for a call originating from a secured subscriber (e.g., telephone 22). The procedure starts when the receiver of the telephone 22 is picked up (i.e., telephone 22 goes off-hook). This is represent by the line 50 at the upper left hand portion of the diagram. The encryption/decryption unit 34 detects the off-hook condition on the line 38 (FIG. 1) and sends a dial tone (as represented by line 52) to the telephone 22 over the line 38.

Also in response to the off-hook condition, the encryption/decryption unit 34 places a call to a secure center 36 via the access network 30 (line 54). The encryption/decryption unit 34 maintains a list of telephone numbers of secure centers 36 in the unit's local area. This list may be ordered according to the proximity of the secure center 36 to the encryption/decryption unit 34 or according to other factors such as relative toll charges. When the encryption/decryption unit 34 receives a busy signal from the network or when the secure center 36 does not answer the call, the encryption/decryption unit 34 may call another telephone number on the list. As discussed below, the numbers in the list may be programmed into the device by the subscriber and/or automatically updated by the secure center 36.

A switch in PSTN 20A (e.g., CO 26) processes the call and sends a ringing signal to the secure center 36 via the inbound port 44 (line 56). In response, the secure center answers the call (i.e., it "picks up" the line) and sends an initialization signal to the encryption/decryption unit 34 (line 58). If the encryption/decryption unit 34 responds with the appropriate acknowledgment signal, the encryption/decryption unit 34 and the secure center 36 communicate to set up a modem connection between one another.

After the connection is established between the encryption/decryption unit 34 and the secure center 36, the secure center 36 verifies that the incoming call is from an authorized subscriber (line 60). This may be accomplished using, for example, Deffie-Helman authentication. The authentication procedure may also use a personal identification number (PIN) when additional security is desired.

Next, the encryption/decryption unit 34 and the secure center 36 exchange encryption keys (line 62). The secure center 36 and the encryption/decryption unit 34 support public and private key algorithms. Initially, the secure center generates an encryption key and asks the encryption/decryption unit 34 for its public key. The secure center encrypts the session number with the public key provided by the encryption/decryption unit 34 and sends the encrypted session number to the encryption/decryption unit 34.

The key exchange process may be accomplished using a symmetrical procedure. In this case, the encryption/decryption unit 34 also generates a random session key that it encrypts with a public key provided by the secure center 36. The unit 34 then transmits the encrypted session key to the secure center 36.

After the unit 34 and the secure center 36 have the symmetric key for the session, they disable the public key algorithm and use a symmetric key algorithm for the rest of the session. From this point forward, the encryption/decryption unit 34 and the secure center 36 encrypt all communications that pass between them over the secured modem channel. Significantly, the operations discussed above are carried out without any interference to the calls.

As represented by the line 64 in FIG. 2, after the subscriber receives dial tone, the subscriber dials the telephone number of the desired destination (telephone 24 in this example). A DTMF decoder in the encryption/decryption unit 34 captures the number and temporarily stores it. In accordance with the invention, the encryption/decryption unit 34 does not send this information to the secure center 36 until after the access network 30 is secured (line 66).

The secure center 36 initiates a call to the telephone 24 using the number supplied by the encryption/decryption unit 34 (line 68). That is, the secure center 36 goes off-hook on an outbound port and dials the telephone number assigned to telephone 24. The PSTN 20B places the call to the telephone 24 (line 70) and sends the appropriate call progress signals (e.g., ringing) to the secure center 36 (line 72). The secure center, in turn, passes these signals back to the telephone 22 (line 74).

When the receiver on the telephone 24 is "picked up" (line 76), a connection is established between the telephone 24 and the secure center 36. In response, the secure center 36 completes its connection to the telephone 22 (line 78). Then, an internal routing mechanism in the secure center 36 (discussed below) connects these two connections to provide the connection between the telephones 22 and 24.

As discussed above, all communications between the encryption/decryption unit 34 and the secure center 36 are encrypted. Thus, a subscriber may have secured communications over his or her access network while communicating with unsecured equipment.

FIG. 3 is a diagram of a call setup procedure for a call placed from an unsecured telephone (e.g., telephone 24) to a secured telephone (e.g., telephone 22). The procedure starts when a caller picks up the telephone 24 (line 80) and calls the subscriber's telephone 22 (line 82). The telephone number (Y) in FIG. 3 is the secured number assigned to a subscriber. This number may be the secure number, a new telephone number, or a prefix followed by a standard telephone number.

According to one embodiment of the invention, when a caller dials the telephone number assigned to the subscriber, the call is routed the secure center 36 rather than the telephone line that is connected to the subscriber's telephone equipment. Thus, the PSTN 20B routes the call to the secure center 36 to establish a connection between the telephone 24 and the secure center 36 (line 84). After the secure center 36 answers the call, it queries the network for details related to the call (e.g., dialed virtual number). The secure center 36 logs the subscriber number (Y) and maps it to the actual number of a subscriber (X) (block 86).

In response to the call from the secure center 36 to the subscriber's telephone 22 (line 87), the PSTN 20A sends the ringing signal to the telephone 22 (line 88). Here, the encryption/decryption unit 34 passes the ringing signal through to the telephone 22 and reports call progress back to the PSTN 20 A. The PSTN 20A, in turn, sends the call progress signals to the secure center 36 (line 89) which relays the call progress to the telephone 24 (line 90).

When the encryption/decryption unit 34 detects an off-hook from telephone 22, it relays this signal (pickup) to the PSTN 20A (line 91). At this point, a connection is established between the secure center 36 and the encryption/decryption unit 34.

In a similar manner as discussed above, the secure center 36 verifies that the destination is an authorized subscriber (line 92) and the encryption/decryption unit 34 and the secure center 36 exchange encryption keys (line 93). From this point forward, the encryption/decryption unit 34 and the secure center 36 encrypt all communications that pass between them.

Then, the secure center 36 connects the connection established between the telephone 22 and the secure center 36 (line 94) and the connection established between the telephone 24 and the secure center 36 (line 95). Thus, the connection is established between the telephones 22 and 24. In accordance with one embodiment of the invention, it may be seen from FIG. 3 that the secure center 36 does not send critical information (e.g., signals from the telephone conversation) to the telephone 22 until after the access network 30 is secure.

Again, all communications between the encryption/decryption unit 34 and the secure center 36 are encrypted after the connection is established. Thus, a subscriber may have secured communications over his or her access network even during communications that were initiated by unsecured equipment.

With the above high-level description in mind, details related to the implementation and operation of the encryption/decryption unit 34 and secure center 36 will now be treated in more detail.

Figure 4:
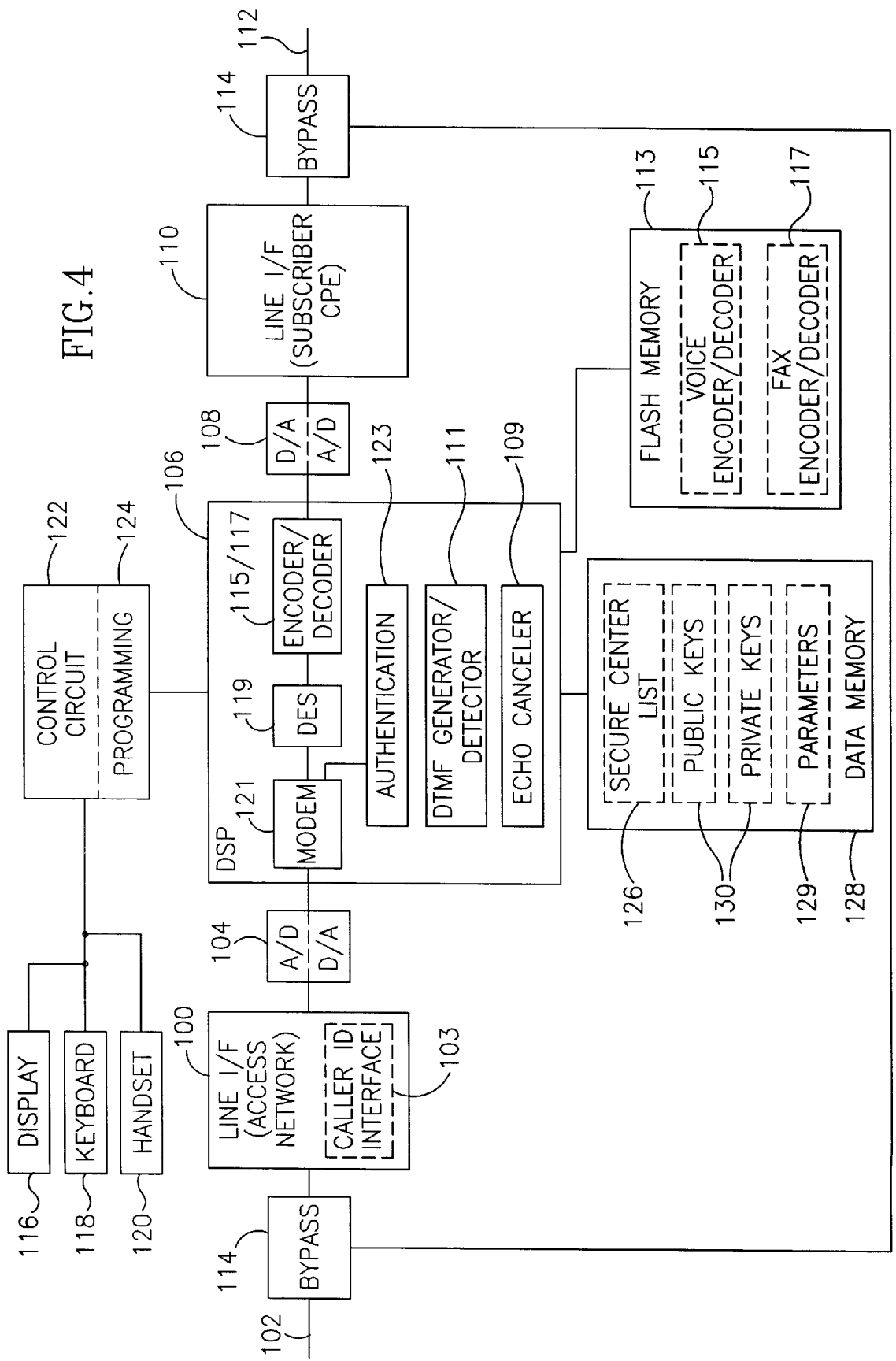
FIG. 4 is a block diagram of one embodiment of a customer premise encryption/decryption unit constructed according to the invention.

FIG. 4 is a block diagram of one embodiment of an encryption/decryption unit 34. A line interface 100, interfaces with a line 102 (e.g., an access network) that connects at some point to the PSTN. The interface 100 provides proper termination for the signals on the line, detects hook status and transfers the caller ID of the caller (via a caller ID interface 103), if applicable.

The interface 100 connects to an analog-to-digital ("A/D") converter and digital-to-analog ("D/A") converter unit 104. This enables a digital signal processor ("DSP") 106 to process the signals coming into the device from the PSTN 20 and to generate signals to be sent to the PSTN 20.

For similar reasons, the DSP 106 connects to another A/D and D/A converter unit 108 that, in turn, connects to a line interface 110. The line interface 100 connects to the subscriber's customer premises equipment via a line 112. The line interface 110 performs operations such as detecting ringing and hook status and it provides the appropriate termination for the line 112. The line 112 may connect directly to an endpoint (e.g., a telephone, a fax machine, a modem) or it may connect to a private branch exchange ("PBX") or other equipment that, in turn, connects to the endpoint.

The DSP 106 is programmed to perform the call processing and encryption/decryption operations for the unit 34. That is, software code is downloaded from a data memory (e.g., flash memory 113) into the DSP 106. The DSP 106 executes the code to perform the corresponding operations.

Initially, the DSP 106 is configured to handle preliminary call setup operations. For example, the DSP 106 can interpret and generate the communication signaling (e.g., using a DTMF generator/detector function 111) passed over on the lines 102 and 112. When the unit 34 receives an incoming call, the DSP 106 determines whether the call is a voice call or a fax call. This may be determined, for example, by an analysis of the initial call setup messages. When the call is a voice call, the unit 34 downloads voice encoder/decoder code 115 into the DSP 106. When the call is a fax call, the unit 34 downloads fax encoder/decoder 117 code into the DSP 106.

The unit 34 also downloads code for other DSP functions from the flash memory 113 to DSP memory. For example, the unit 34 downloads code for a DES encryption/decryption function 119, a modem function 121, a Deffie-Helman authentication function 123, an echo canceling function 109, as well as the DTMF function 111 discussed above. The DSP memory may be internal to the DSP 106 (as represented by the boxes in the DSP 106 in FIG. 4) or the DSP 106 may use external memory for its executable code.

A brief description of some of the operations of the DSP 106 follows. To establish the secure channel, the DSP Deffie-Helman function 123 generates and processes authentication information. The modem function 121 modulates the generated authentication information and sends it to the D/A converter 104. The D/A converter 104 converts the modulated digital stream to an analog stream and sends it to the secure center 36 via the line 102. When the unit 34 receives incoming authentication information, the modem function 121 demodulates the received information (after the A/D conversion process) and sends the demodulated data to the Deffie-Helman function 123.

For voice calls, voice information received via the line 112 is digitized by the A/D converter 108 and routed to the voice encoder function 115. The voice encoder function 115 compresses the incoming data stream (typically 64 kbit/s) into an 8 kbit/s data stream. The DES function 119 encrypts this stream and sends it to the modem function 121. Then, as above, the modulated digital stream is converted to analog and sent to the secure center 36.

Voice information received via the line 102 is digitized by the A/D converter 104 and routed to the modem function 121. The modem function 121 demodulates the signal and sends it to the DES function 119. The DES function 119 decrypts this stream and sends it to the voice decoder function 115. The voice decoder function 115, in turn, decompresses the 8 kbit/s data stream into, for example, a 64 kbit/s data stream. The D/A converter 108 converts this digital stream to analog and sends it to the appropriate endpoint via line 112.

For fax calls, fax information received via the line 112 is digitized by the A/D converter 108 and routed to the fax encoder function 117. The fax encoder function 117 encodes the incoming data stream (typically 14.4 kbit/s, 9.6 kbit/s, etc.) into an 8 kbit/s data stream. This stream is then processed as discussed above.

Similarly, fax information received via the line 102 is demodulated and decrypted. The decrypted information is then routed to a fax decoder function 117 that decodes the data, as necessary. This data is then converted to analog and sent over the line 112.

The operations described above may be implemented in a variety of ways. For example, in one embodiment the DSP 106 supports V.32 modem, G.729A vocoder, FAXRELAY, DES 56 bit encryption/decryption and Deffie-Helman 512 bit public key authentication operations. It would be appreciated by one skilled in the art, however, than numerous other modem, vocoder, fax encoder/decoder, encryption/decryption and authentication techniques may be used such as V.34 modem, G.723.1 vocoder, 128 bit DES (triple DES) and 1024 bit Deffie-Helman.

The encryption/decryption unit 34 also includes a bypass circuit 114. The circuit 114 enables a subscriber to bypass the security functions performed by the encryption/decryption unit 34. It may be desirable to bypass the security functions in the event of a power failure or for other reasons.

A display 116, a keyboard 118 and a handset 120 enable the subscriber to configure the device, receive call progress information and perform other operations. For example, under the control of a control circuit 122, the display may provide information regarding the call status (dialing) or the level of security (secured/unsecured). Similarly, the speaker of the handset may provide audible indications (e.g., two beeps means secured) related to various information.

The control circuit 122 also provides programming functions 124 to configure the encryption/decryption unit 34. For example, the unit 34 may be programmed by the subscriber using the keyboard 118 and display 116. Alternatively, the unit 34 may be programmed by the CPE (e.g., using a telephone keypad). Typically, however, the device is programmed by the secure center 36 during the authentication procedure discussed above. In this case, the control circuit 122 communicates with the DSP 106 to send and receive programming information over the line 102. Programming operations may include storing the telephone numbers 126 of local secure centers (discussed below) or other parameters 129 in a data memory 128. In addition, various encryption/decryption parameters (e.g., keys 130) may be programmed into the encryption/decryption unit 34.

As discussed in more detail below, the unit 34 may also be updated/reconfigured remotely through a remote software download feature. Briefly, the software is downloaded into the unit 34 via an input line and stored in the flash memory 113. The software is then available to be downloaded from the flash memory to the DSP memory during the call setup procedure in the manner discussed above.

The components of the encryption/decryption unit 34 may be implemented using a variety of devices. For example, in one embodiment, a MITEL MH88422-2 may be used for the line interface 100. The A/D and D/A units 104 and 108 may be AD1847JP CODECS sold by ANALOG DEVICES. The DSP may be a TEXAS INSTRUMENTS TMS320542PGE-2-50 and the line interface 110 may be a Subscriber Line Interface Card, PBL 3766 sold by ERICSSON. The display 116 may be a DV16230B sold by DATAVISION. Finally, the bypass circuit 114 may consist of a set of relays, operating under the control of the control circuit 122. To provide the bypass, the relays are configured to disconnect the signal paths between the line 102 and interface 100 and between line 112 and interface 110 and provide signal paths between the lines 102 and 112. Again, it should be appreciated by one skilled in the art that a variety of other components may be used in practicing the invention. In addition, it should be appreciated that the above components and processes may be implemented and miniaturized on an integrated chip or chip set.

Figure 5:
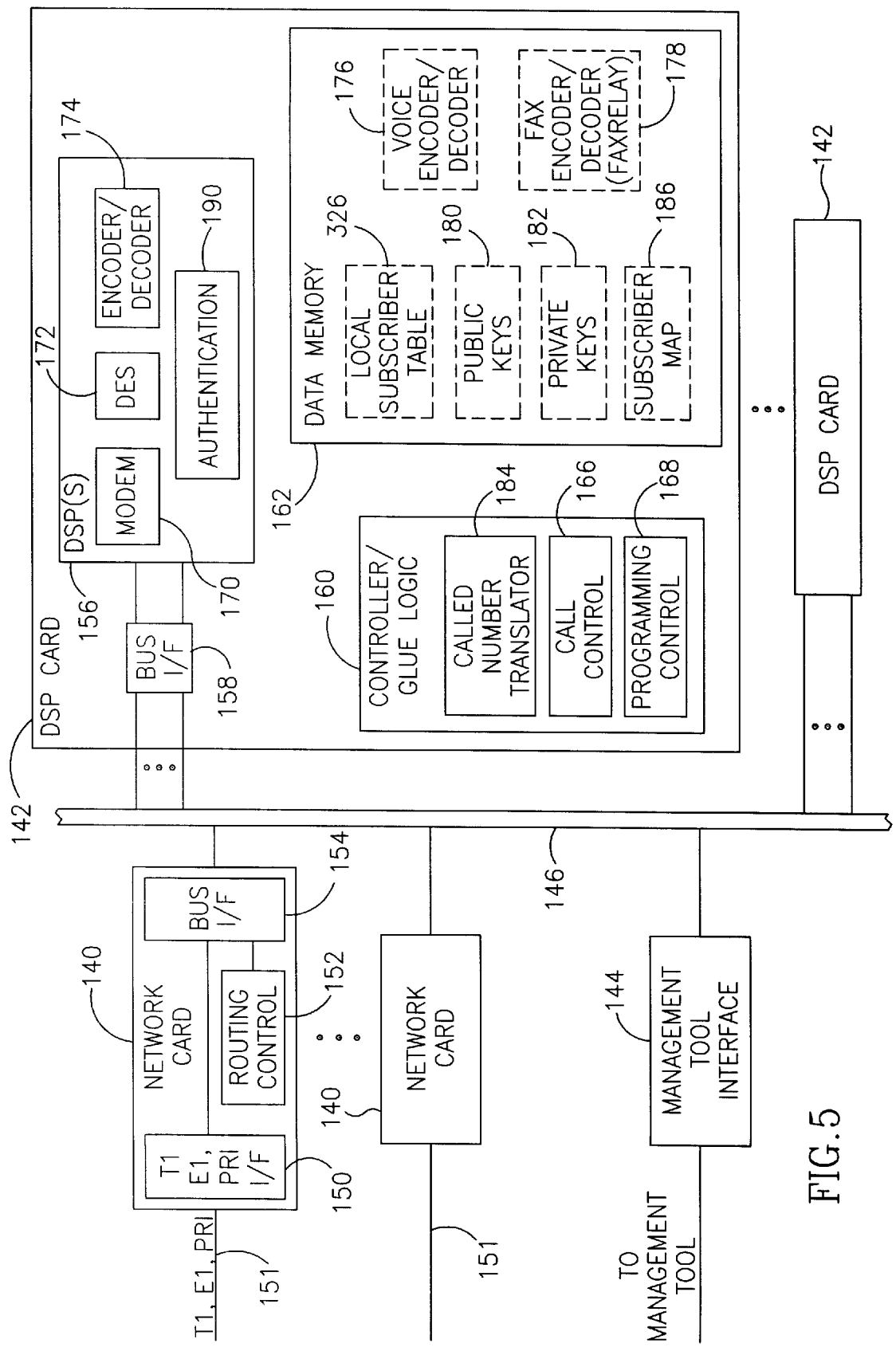
FIG. 5 is a block diagram of one embodiment of a network-based encryption/decryption switching system constructed according to the invention.

Referring now to FIG. 5, a block diagram of one embodiment of a secure center 36 is shown. The secure center 36 includes one or more network cards 140 (upper left), one or more DSP cards 142 (right) and a management tool interface card 144 (lower left). These components communicate with one another via a multiplexed bus 146. To reduce the complexity of FIG. 5, the details of the components are only depicted for one of each of the components.

The network card 140 communicates with a switching node in the PSTN 20 such as CO 26 (FIG. 1). In the embodiment of FIG. 5, the network card 140 includes a line interface 150 (a T1 interface, an E1 interface or an ISDN PRI interface) to terminate a T1, E1 or ISDN PRI trunk (line 151) from the switching node. The trunks 151 carry multiplexed, digital call signals. For example, an E1 trunk provides 30 digital channels, each of which carries signals for one call. It will be appreciated by one skilled in the art that the secure center 36 may interface to the PSTN 20 using methods other than those depicted in FIG. 5.

The network card 140 includes a channel routing controller 152 and a bus interface 154 to route the call traffic to and from the DSP cards 142. Under the control of the channel routing controller 152, the signals for each channel are routed through the bus interface 154 to and from a specific DSP 156 in one of the DSP cards 142. Via the management tool interface 144, the management tool (not shown) may control call distribution to the DSPs 156. For example, the call distribution may be set up so that inbound calls are randomly distributed to the DSPs 156. Alternatively, calls from certain encryption/decryption units 34 may be routed to specific DSPs 156 that support the same protocols as the units 34.

In addition to one or more DSPs 156, the DSP card 142 includes a bus interface 158, a controller 160 and data memory 162. The bus interface 158 terminates the bus 146 and routes the DSP call traffic to and from the DSP cards 142. In one embodiment, the bus interface 158 distributes call traffic for several DSPs 156 on the DSP card 142 under the control of the controller 160.

The controller 160 provides numerous control functions for the DSP card 142 and includes the glue logic for the DSP card. A call progress controller 166 handles the call control operations such as call setup in conjunction with the DSP 156. Here, the DSP 156 terminates and generates call signals under the control of the controller 160. In cooperation with the management tool 144, a programming controller 168 may control the programming of the DSPs 156 in the secure center 36 or in the encryption/decryption units 34. The controller 160 also may provide multi-level call authorization for access to different network resources. For example, long distance services can be restricted for certain subscribers.

The DSP 156 in the DSP card 142 is programmed to perform similar functions as the DSP 106 in the encryption/decryption units 34 discussed above. For example, the DSP 156 interprets and generates the communication signals (e.g., DTMF) received from and transmitted to the network card 140, respectively. The DSP 156 includes a modem function 170 that modulates and demodulates the outbound and inbound signals to and from the network card 140. A DES function 172 encrypts and decrypts the signals. An encoder/decoder function 174 compresses and decompresses the signals. For example, in an embodiment compatible with embodiment of the encryption/decryption unit 34 described in FIG. 4, the DSP 156 performs V.32 modem, G7229A vocoder, FAXRELAY, DES 56 bit encryption/decryption and Deffie-Helman authentication operations.

Figure 6A:
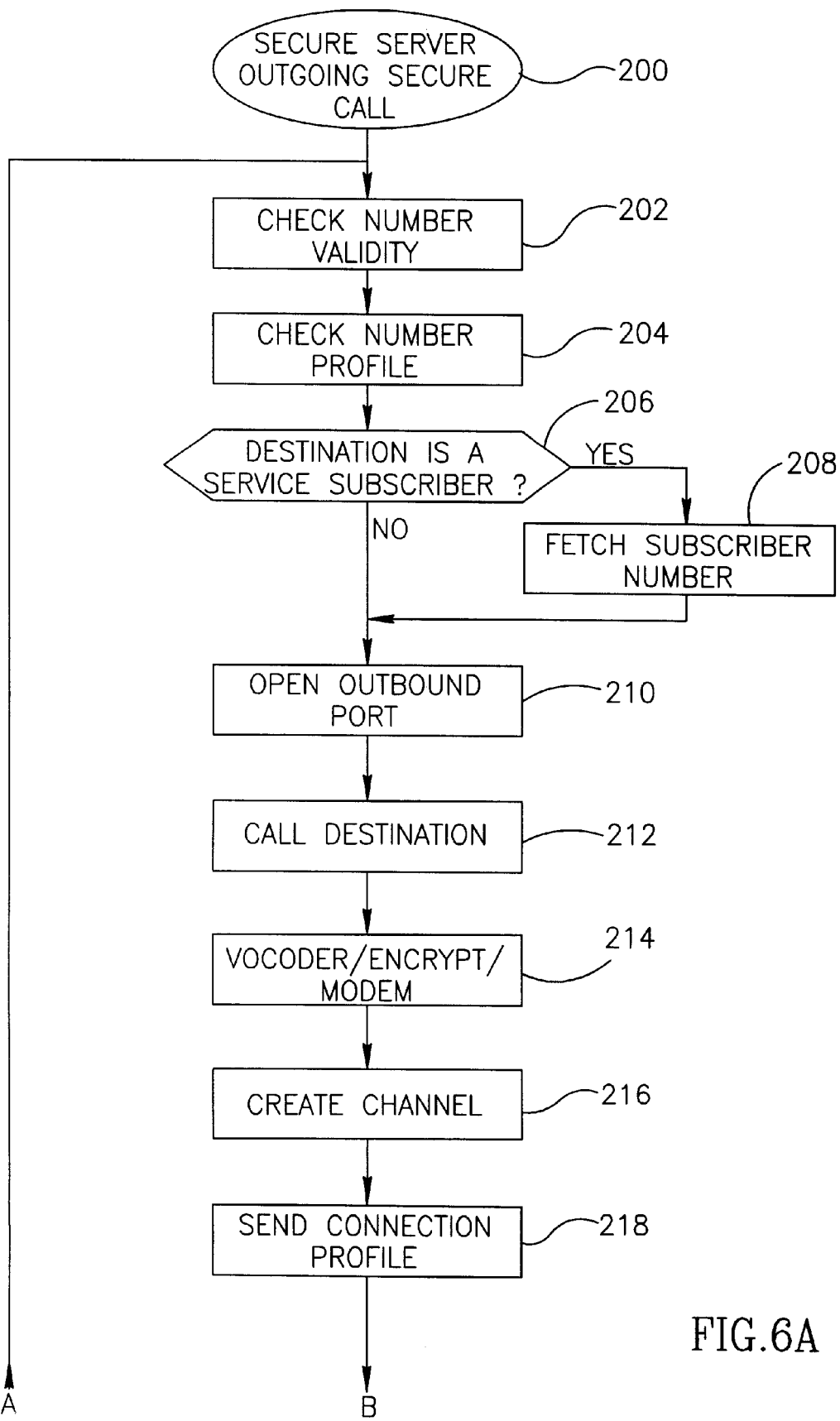
FIGS. 6A and 6B are a flowchart of call setup operations, for a call originating from a secured subscriber, that may be performed by the network-based encryption/decryption switching system of FIG. 5.
Figure 6B:
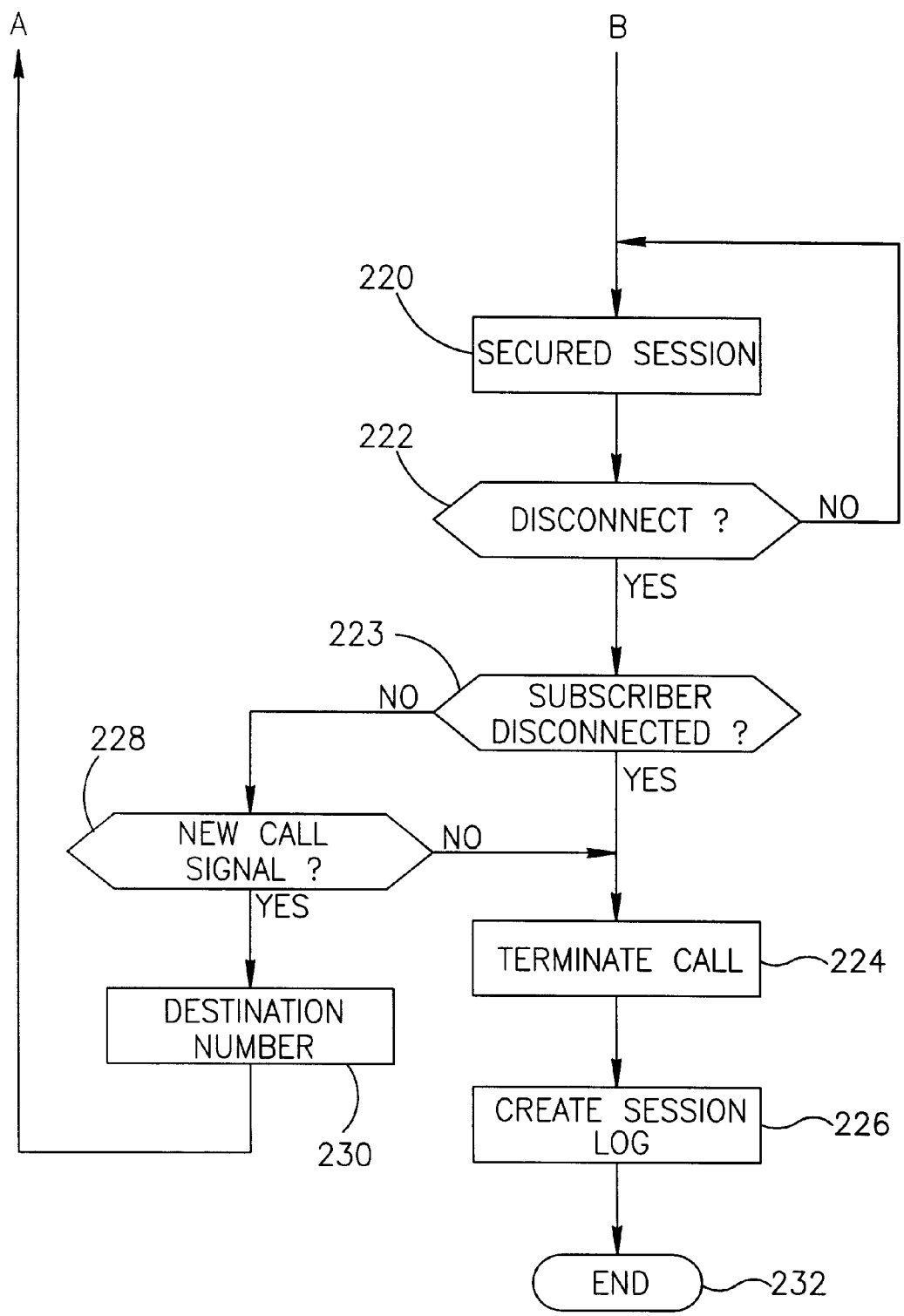

The operations of the components depicted in FIG. 5 will now be treated in more detail in conjunction with FIGS. 6A, 6B, 7A and 7B. Beginning at block 200, FIGS. 6A and 6B illustrate exemplary call processing operations performed by the secure center 36 for a call placed by a secured subscriber to an unsecured destination (i.e., a non-subscriber).

This process commences at the stage of the call process that occurs after the "pass digits" step described above in conjunction with FIG. 2. Thus, at this stage, the call has been routed to one of the DSPs 156 in the secure center. The encryption/decryption functions 119 and 172 and the modem functions 121 and 170 for the call have been downloaded from the flash memory 113 and hard drive (not shown) into the DSPs 106 and 156 in the encryption/decryption unit 34 (FIG. 4) and the secure center 36, respectively. A secure connection is established between the unit 34 and the secure center 36. And the destination telephone number has been received by the DSP 156 in the secure center 36.

At block 202, the controller 160 receives the digits from the DSP and determines whether the number dialed by the subscriber is valid. For example, the controller 160 compares the destination number to the telephone number descriptions contained in a table (not shown) that are known to comply with the network numbering scheme. If the dialed number does not comply with the network numbering scheme, the controller 160 may send a request to the encryption/decryption unit 34 for another destination telephone number. Alternatively, the controller 160 may send a non-compliance signal to the encryption/decryption unit 34. The encryption/decryption unit 34 may respond to these message, for example, by sending another number or by sending an error message to the telephone 22 (FIG. 1).

If the destination number is valid, at block 204 the controller 160 checks the number profile and determines whether the destination number is associated with another subscriber of the secure service (block 206). This operation is discussed in more detail below in conjunction with FIG. 8.

At block 210, the controller 160 opens a new outbound port. That is, a channel other than the one the inbound call was received on is established between the DSP 156 and the PSTN 20. At block 212, the controller 160 calls the destination (e.g., telephone 24) over the new channel.

Next, at blocks 214, 216 and 218, a secure channel is set up between the unit 34 and the secure center 36. At block 214, the vocoder functions (i.e., voice encoder/decoder 115 and 176) or FAXRELAY functions 117 and 178 for the call are downloaded into the DSPs 106 and 156 in the encryption/decryption unit 34 (FIG. 4) and the secure center 36, respectively. After the channel is established at block 216, the controller 160 sends the connection profile to the encryption/decryption unit 34 (block 218). This profile includes, for example, the public keys 180 as well as instructions and data used to perform tests on the unit 34. In addition, at this time the controller 160 may configure or update the unit 34 as discussed above. Also, in configurations where the unit 34 uses least cost routing, the connection profile may include profiles of the billing system.

Once the secured connection has been established between the subscriber and the unsecured destination (after passing keys 180 and 182, as necessary), all communications over the access network are encrypted by the encryption/decryption unit 24 and the secure center 36 (block 220).

The unit 34 sends encrypted data over the access network to the DSP 156. In the DSP 156, the modem function 170 demodulates the data, then the DES function 172 decrypts the demodulated data. Next, depending on whether this is a voice or fax call, the vocoder function 176 or the FAXRELAY function 178 that was loaded into the DSP 156 (encoder/decoder function 174) processes (e.g., decompresses) the decrypted data. The DSP 156 sends the resulting data out over the second channel and the network routes this data to the destination telephone.

When the destination telephone sends information to the secured subscriber, the DSP 156 receives the corresponding data via the second channel. The vocoder function 176 or the FAXRELAY function 178 that was loaded into the DSP 156 processes (e.g., compresses) the data and sends it to the DES function 172 which encrypts the data. Next, the modem function 170 modulates the encrypted data and the DSP 156 sends this data to the unit 34 via the first channel.

The session continues until one of the parties disconnects (block 222). If, at block 223, the subscriber disconnected, the call is terminated (block 224), the controller 160 creates a session log (block 226), then the process terminates (block 232) until the next session is initiated.

If, at block 223, the subscriber did not disconnect, the controller 160 determines whether a new call is pending (block 228). If so, the process proceeds to block 230 and the controller 160 retrieves the new destination number dialed by the subscriber. If a new call was not pending at block 228, the process proceeds to block 224 and the controller 160 terminates the call as discussed above.

Figure 7A:
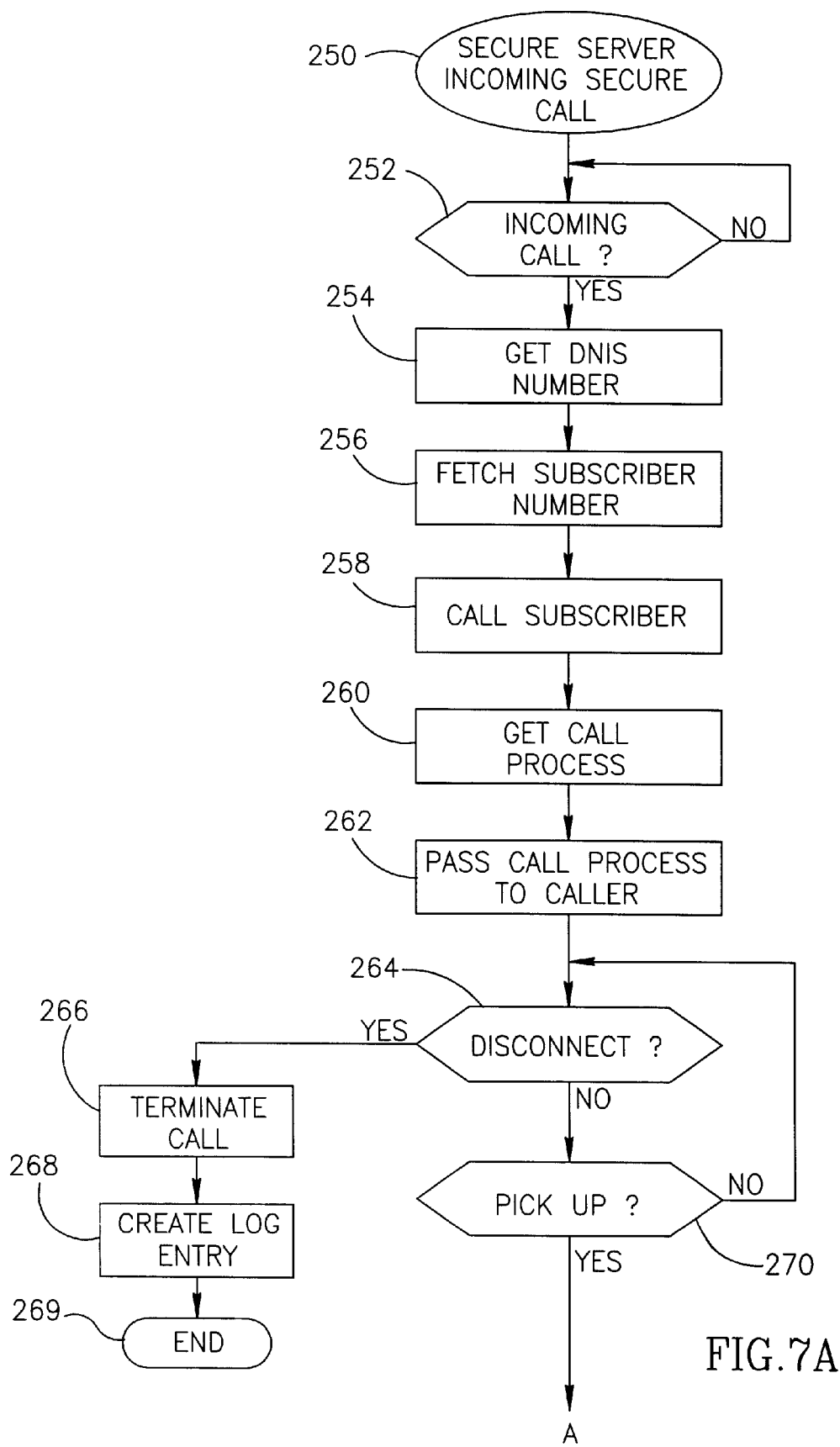
FIGS. 7A and 7B are a flowchart of call setup operations, for a call placed to a secured subscriber, that may be performed by the network-based encryption/decryption switching system of FIG. 5.
Figure 7B:
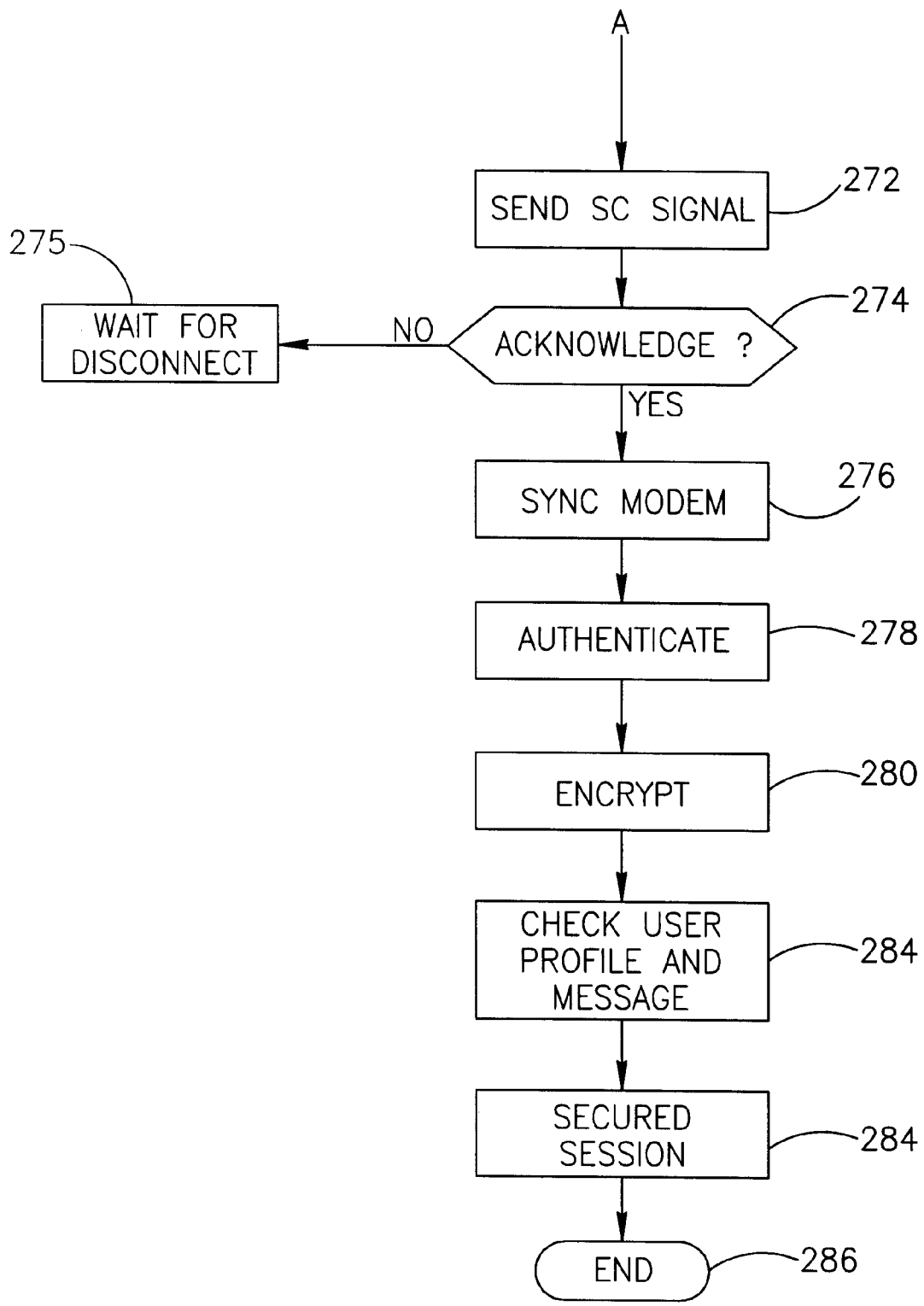

Referring now to FIGS. 7A and 7B, exemplary call processing operations performed by the secure center 36 during a call from an unsecured destination to a secured subscriber are illustrated beginning at block 250. The process depicted commences at a stage in the call process that coincides with the first step described above in conjunction with FIG. 3.

At block 252, the controller 160 waits for an incoming call. The unsecured caller calls a subscriber by dialing a telephone number that initiates a call to the secure center 36. After the secure center 36 receives the call, the controller 160 retrieves the dialed number identification service ("DNIS") information associated with the call from the DSP 156 (block 254).

At block 256, a called number translator 184 maps the DNIS information to the actual telephone number of the subscriber by comparing the DNIS to the telephone numbers in a subscriber map 186. In a typical embodiment, the upper set of digits in the DNIS identify a hunt group associated with the secure center 36. Thus, the switching equipment in the PSTN 20 (e.g., in the CO 26) uses this information to route the call to the secure center 36. The called number translator 184 compares the lower set of digits (e.g., the last three or four digits) of the DNIS with the subscriber map entries to determine the destination telephone number (i.e., the telephone number of the subscriber who is being called). The controller 160 passes this number to the DSP 156 which initiates the call to the subscriber (block 258).

As discussed above in conjunction with FIG. 3, the controller 160 receives the call progress from the PSTN 20 (block 260) and passes this information back to the caller (block 262). In the event of a disconnect (block 264), the process proceeds to block 266 where the call is terminated. Then, the controller 160 creates a session log (block 268) and the process terminates (block 269) until the next session is initiated.

If, at block 264, the call was not disconnected, the controller 160 waits for an answered indication from the destination. After the call is answered (block 270), the controller 160 sends a secure connection ("SC") signal to the encryption/decryption unit 34 (block 272).

If the encryption/decryption unit 34 does not acknowledge the SC signal (block 274), the call will be disconnected at block 275. Otherwise, the modem functions 121 and 170 for the unit 34 (FIG. 4) and the secure center 36 are synchronized (block 276) and the authentication functions 123 and 190 (FIGS. 4 and 5) exchange authentication information (block 278).

Next, the secure center 36 and the encryption/decryption unit 34 cooperate to secure the access network (block 280). In addition, when the connection to the subscriber is initially being set up, the controller 160 checks the subscribers profile and messages, as necessary (block 282).

Once the secured connection is established between the endpoints (e.g., telephones 22 and 24), the secure center processes the call (e.g., encrypts/decrypts the data) as discussed above (block 284). After the call is completed, the process terminates at block 286 until the next session is initiated.

The components of the secure center 36 may be implemented using a variety of devices. For example, as in the encryption/decryption unit 34, the DSP 156 may be a TEXAS INSTRUMENTS TMS320542PGE-2-50. The network card 140 may be a commercially available T1, E1 or ISDN card sold by vendors such as DIALOGIC.

Figure 8:
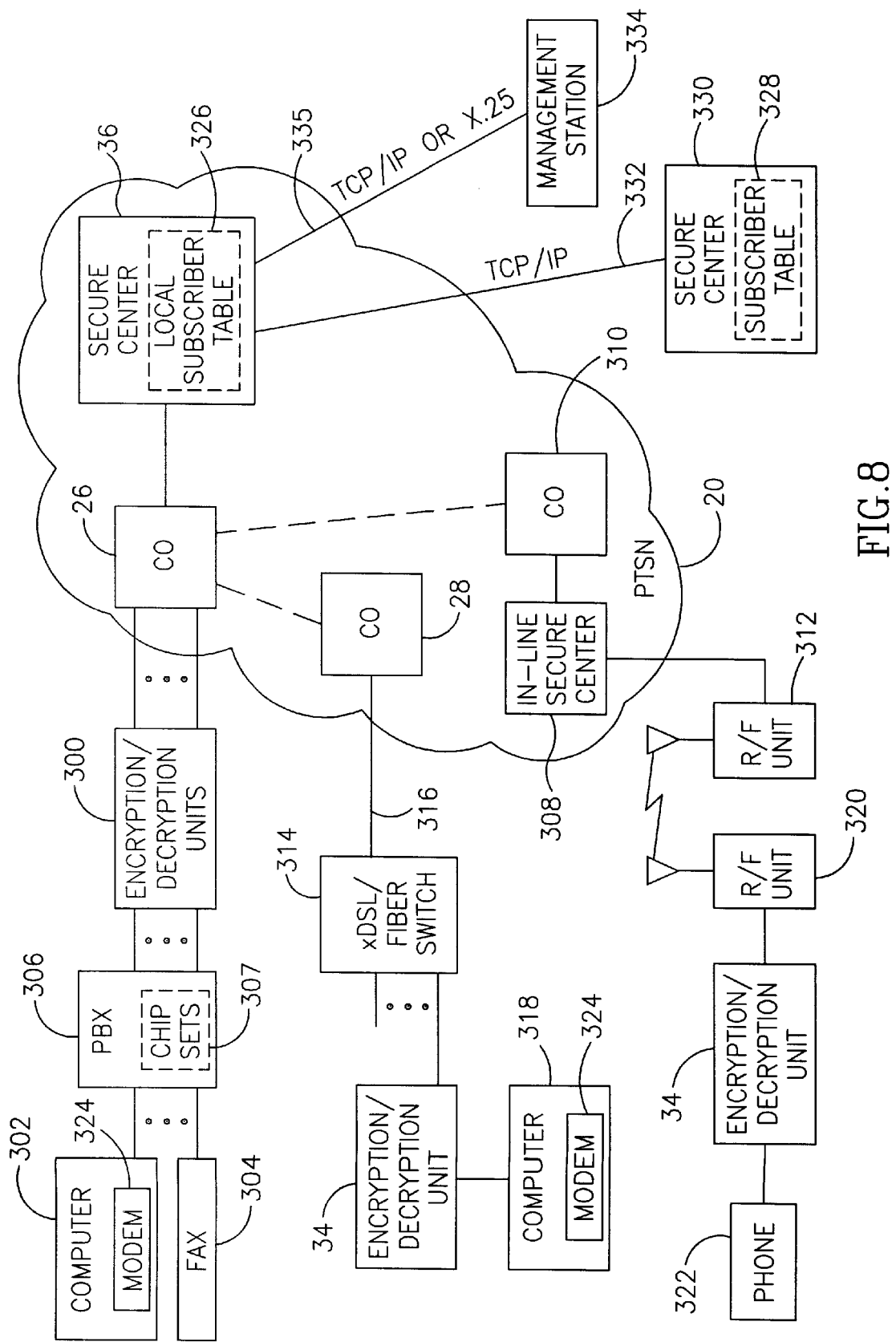
FIG. 8 is a block diagram that illustrates several embodiments of network encryption/decryption systems constructed according to the invention.

FIG. 8 illustrates several different configurations that may be employed in implementing the invention. For example, the encryption/decryption units 34 may be implemented in a multi-unit system 300. That is, the multi-unit system includes several units 34, implemented using one or more DSPs. This configuration may be used to enable subscribers to share the secured call resource. This is desirable, for example, when the subscribers only occasionally place secured calls. In this configuration, the terminals (e.g., telephones, fax machines, computers with modem or other telephony components) are connected to a PBX 306 and may access the secured service using an option supported by the PBX 306. If all of the units 34 in the system 300 are not currently in use, the PBX 306 routes the call to one of the units 34 in the system 300. Thus, the system may provide secure service to many users in an economical manner over the critical portion of the network: the access network between the PBX 306 and the PSTN 20.

In another embodiment, the units 34 may be integrated into the CPE. For example, the units 34 may be implemented as chip sets 307 that are integrated into line cards in the PBX 306.

FIG. 8 illustrates an embodiment of the invention where an in-line secure center 308 is installed in the access network (i.e., it intercepts calls to and from the CO). Here, the in-line secure center 308 includes appropriate line interfaces to interface to the CO 310 and the equipment on the access network (e.g., unit 312). In addition, appropriate modifications are made for the call distribution to the switching equipment in the CO 310.

FIG. 8 also depicts several different types of access networks. The access network may include a type of digital subscriber loop ("xDSL," where the "x" represents different types of DSLs) where calls are routed from the CO 28 to and from a remote XDSL switch (represented by switch 314) over a multiplexed line (represented by line 316). The XDSL switch then routes the calls to and from the subscribers (e.g., computer 318). The access network also may use a fiber distribution system. In this case, the line 316 is a fiber optic link and the switch 314 is a switch that terminates the fiber link and distributes the calls as above. The access network also may consist of a wireless local loop where appropriate wireless transceivers 312 and 320 are used between a CO (e.g., 310) and the subscriber (e.g., telephone 322).

FIG. 8 also illustrates an embodiment of the invention that provides end-to-end secured connections. For example, endpoints 304 and 318 both have associated encryption/decryption units 34. Both of the units 34 are programmed with the telephone number of the secure center 36.

The secure center 36 establishes end-to-end service by determining whether the called destination is a subscriber. Referring again to FIG. 6A, at block 206, the controller 160 checks subscriber tables 326 or 328 located in the secure center 36 or in a central database 330. In one embodiment, the secure center 36 accesses the central database 330 over an Internet TCP/IP connection 332.

The subscriber tables 326 and 328 contain lists of subscribers and their actual telephone numbers. A subscription table may contain subscribers located in an area local to the secure center 36 (e.g., table 326) or it may contain all of the subscribers in the network (e.g., table 328).

If the destination is a subscriber, the controller 160 (FIG. 5) retrieves the subscriber's telephone number (block 208) and establishes a secured session with the destination in a similar manner as discussed above. Once the secured session is established, the information sent from the DSP 156 to either destination will be encrypted.

In one embodiment the information is encrypted end-to-end, except for inside the secure center. That is, the secure center 36 decrypts the information received from each unit 34 and encrypts the information sent to each unit 34.

In an alternative embodiment, the secure center 36 may disable these encryption and decryption operations and simply pass the encrypted data to the two endpoints. This may be accomplished, for example, by configuring the network cards 140 to route the call traffic directly from one channel to another channel, bypassing the DSP card 142. In this case, however, the DSP card 142 still provides initial call setup, key passing and other operations to assist the endpoints in establishing the connection. In addition, the DSP card 142 may monitor the connection.

Other configurations that incorporate the teachings of the invention may be understood by further reference to FIG. 8. For example, secured conferences between more than two participants may be provided by routing the calls through a single secure center 36. The secure center 36 may be connected (either directly or indirectly) to any node in the PSTN 20. Thus, secure centers 36 may be distributed throughout the PSTN 20 to provide the desired level of secured call services.

FIG. 8 also illustrates a management station 334 used to manage the system. The management station 334 and the secure center 36 both provide computer telephony integration ("CTI") interfaces. The secure center 36 may be configured and managed from the management station 334 via, for example, a TCP/IP or X.25 link (line 335). This includes, for example, database management, key management, audit record-keeping, managing user profile information and monitoring performance.

Figure 9A:
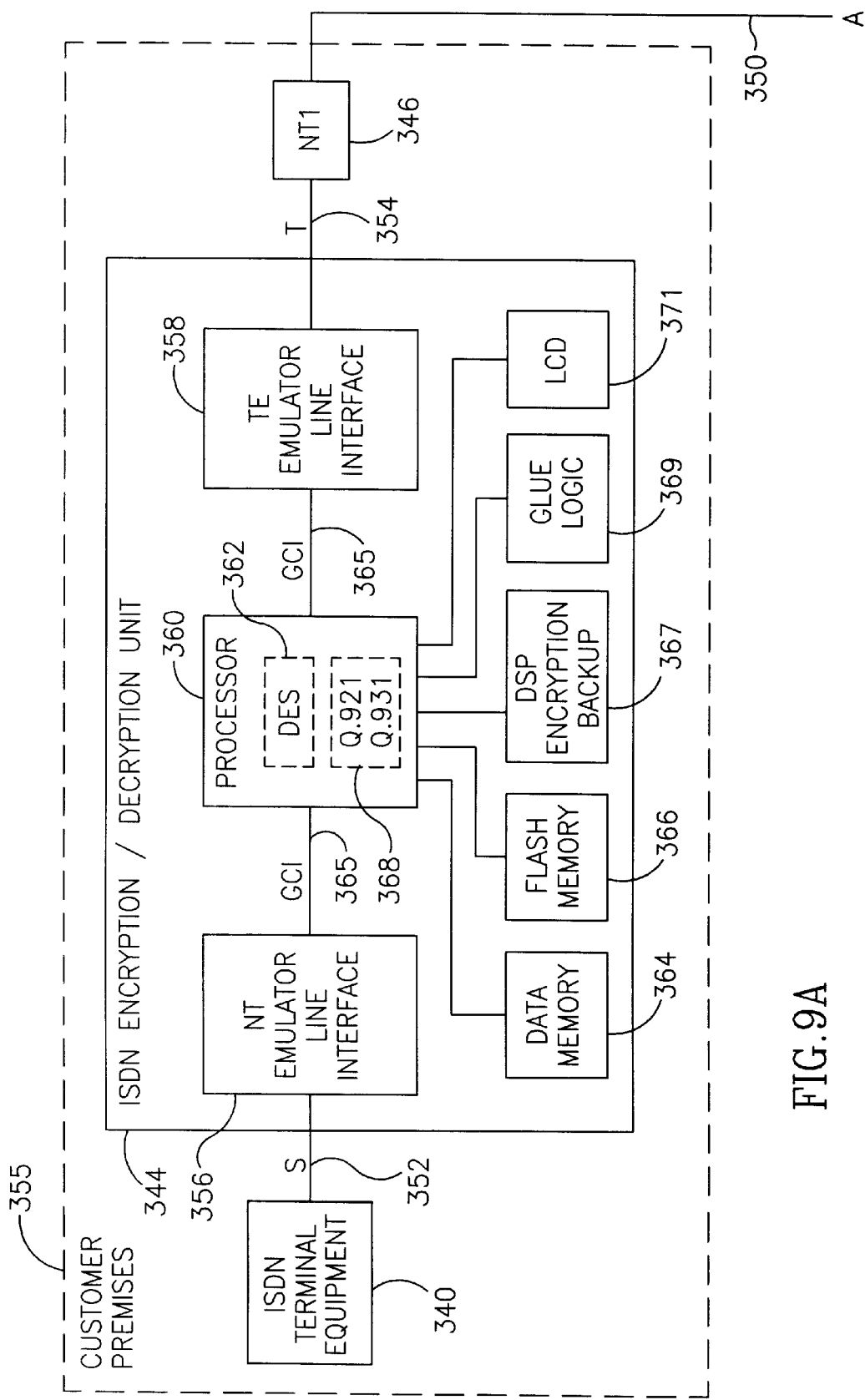
FIG. 9 is a block diagram of a telephone network incorporating one embodiment of an ISDN-based network encryption/decryption system that is constructed according to the invention.
Figure 9B:
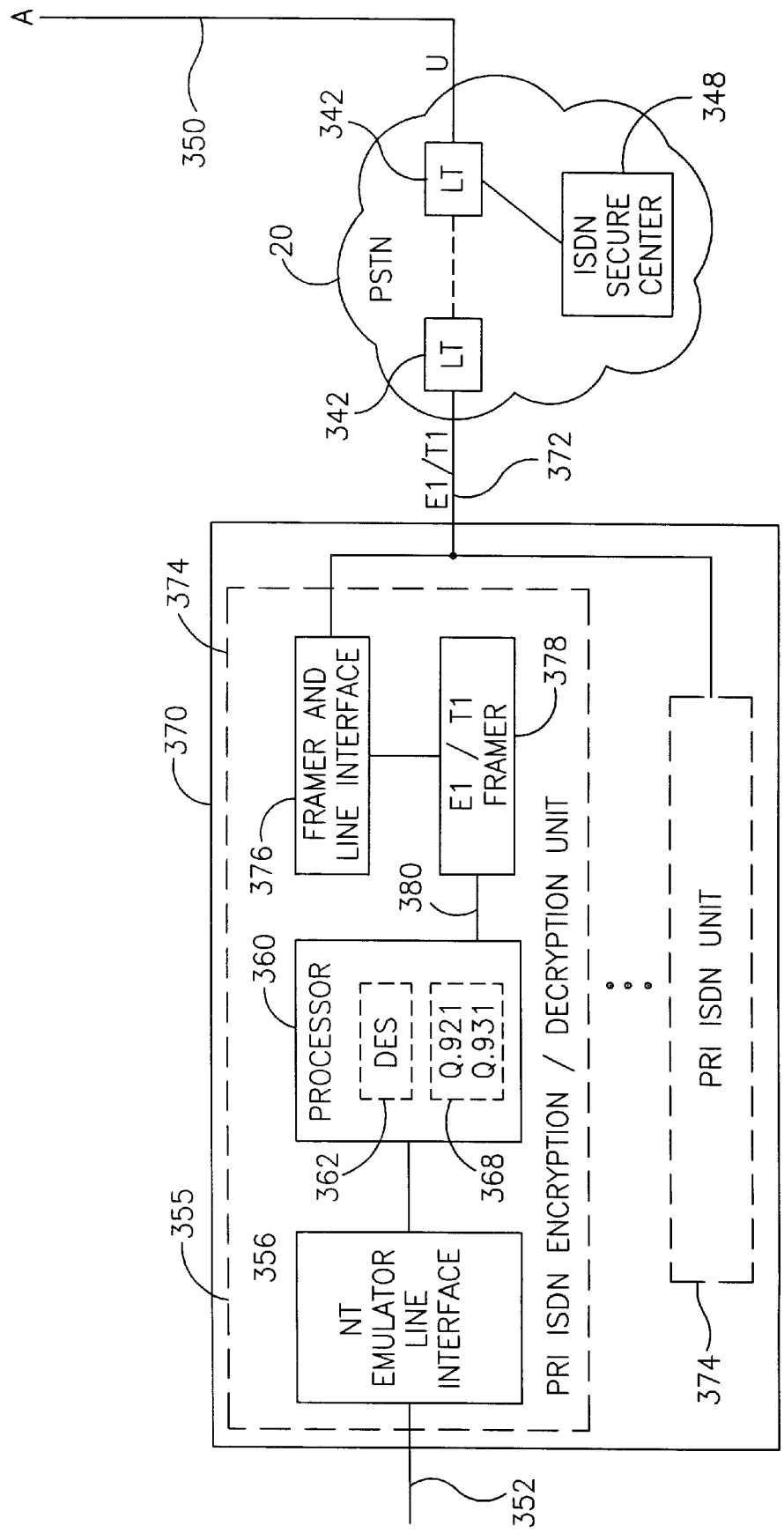

Referring to FIGS. 9A and 9B, an embodiment of the invention that supports ISDN BRI terminals and ISDN PRI channels is shown. A subscriber using ISDN terminal equipment ("TE") 340 establishes a call to a local exchange (designated "LT") 342 in the network 20 via an ISDN encryption/decryption unit 344 and a network termination 1 ("NT1") 346. In accordance with the invention, a secure center 348 (configured with ISDN cards as discussed above) cooperates with the ISDN encryption/decryption unit 344 to establish a secured call over the access network (represented by line 350).

The components communicate over ISDN-defined interfaces. The TE 340 and the ISDN encryption/decryption unit 344 communicate over a four wire ISDN S interface 352. The encryption/decryption unit 344 communicates with the NT1 346 over a four wire T interface 354. The T interface 354 is a subset of the S interface 352. The NT1 346 marks the point at which the public network 20 ends and the customers premises 355 begins. The NT1 346 provides a conversion at the physical layer between the T interface 354 and the U interface 350 that connects to the local exchange 342.

The ISDN encryption/decryption unit 344 includes two interfaces: one for the TE side and another for the NT1 side. The TE side interface 356 provides NT1 emulation. The NT1 side interface 358 provides TE emulation.

The ISDN encryption/decryption unit 344 includes a processor 360 that performs an encryption/decryption function 362, encoding and other functions that are similar to those perform by the DSP discussed above. The unit 344 encrypt/decrypts the two B channels of the BRI signal but does not encrypt the D channel. The unit 344 also performs signaling functions such as Q.931 or Q.921.

The ISDN encryption/decryption unit 344 also includes data memory devices 364 and 366, glue logic 371 and a DSP encryption backup component 367 that cooperate to support the programmability of the unit 344 and provide other functions. It should be understood that, as in a typical electronic system, the glue logic depicted in the embodiments above may serve to connect some or all of the components in the respective unit. Many of the above components as well as the input and output devices (e.g., LCD 369) and other circuitry (not shown) perform similar functions as the components described in conjunction with FIG. 4. Accordingly, some similar hardware components and software programs may be utilized in the two embodiments.

The ISDN encryption/decryption unit 344 may be constructed using a variety of devices. For example, the interfaces may be implemented using MC145574PB S/T INTERFACE chips sold by MOTOROLA. The processor may be implemented using one of the Quad Integrated Communications Controllers sold by Motorola. The processor may communicate with the interfaces via a general circuit interface 365 ("GCI").

FIG. 9 also illustrates a multi-unit encryption/decryption device 370 that interfaces to an PRI ISDN link 372. As is known in the art, the PRI ISDN link may be carried over an E1 line (30B+D) or a T1 line (24B+D). In one embodiment, the device 370 includes several PRI ISDN encryption/decryption units 374. In an alternate embodiment (not shown), the components after the framers 376 and 378 (e.g., the processor 360, etc.) may be housed in separate units that connect to the device 370 via a channel represented by line 380. For example, the PRI ISDN channel may be separated into each of its BRI channels. Each of the BRI channels, in turn, would then be connected to a corresponding encryption/decryption unit via a physical line.

The functions of the framers 376 and 378 are to interface a single channel with the multiplexed PRI channels. The framer and line interface 376 originates and terminates the E1 line or the T1 line. This includes detecting and generating the appropriate framing for the line. The E1/T1 framer demultiplexes and multiplexes a single channel (e.g., a BRI channel) from and onto the PRI ISDN link, respectively.

The single channel connects to a processor 360 that provides encryption and decryption functions 362 and signaling functions 368. On the other side of the processor 360 the channel connects to ISDN terminal equipment (not shown) via a line interface 356. To reduce the complexity of FIG. 9, the remaining components in the unit 374 (e.g., the DSP encryption backup 367, glue logic 369, data memory 364, flash memory 366 and LCD 371) are not illustrated. It should be understood that these components may perform similar functions as described above in conjunction with the ISDN encryption/decryption unit 344 depicted in FIG. 8.

From the above, it may be seen that the invention provides an effective security system for telephony applications. The system may secure the connection without requiring intervention by the subscriber. The network-based encryption/decryption equipment automatically determines whether the call is to or from a secured party and sets up a secured call accordingly.

The system also provides end-to-end security when all of the parties have encryption/decryption equipment. Again, the secured connection may be established automatically, without assistance from the subscribers.

The system reduces the possibility that an eavesdropper will trace a call because a subscriber always calls a secure center. The actual destination telephone number is only passed after the line is secured.

Also, the invention reduces the possibility of monitoring by the telephone service provider because the telephone numbers of the source and the destination are not passed over the network. Rather, the calls to or from the subscriber are, in effect, hidden by the secure center front-end.

While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur. For example, various methods of data encryption may used in practicing the invention. A number of methods may be used to route calls to or from a secure center or to perform other related call routing operations. Also, the invention may be implemented using a variety of hardware components in conjunction with appropriate software algorithms. Thus, the specific structures and methods discussed in detail above are merely illustrative of a few specific embodiments of the invention.

What is claimed is:

1. A method for providing secure communications over a telephony network, wherein the network provides connectivity for communications between a plurality of customer premises and wherein the network includes a plurality of switching nodes for providing the connectivity, the method comprising the steps of:

seamlessly establishing a secured connection between a first one of the customer premise equipment and an encryption and decryption apparatus;

seamlessly establishing a connection between a second one of the customer premise equipment and the encryption and decryption apparatus;

seamlessly connecting the secured connection with the connection established between the second one of the customer premise equipment and the encryption and decryption apparatus; and sending destination information over the secured connection.

2. The method of claim 1 wherein the encryption and decryption apparatus is installed at a switching node.

3. The method of claim 1 further comprising the step of distributing communications for a plurality of customer premises equipment to a plurality of encryption and decryption processes executing on the encryption and decryption apparatus.

4. The method of claim 1 wherein the connecting step comprises merging the secured connection and the connection established between the second one of the customer premise equipment and the encryption and decryption apparatus into a single connection.

5. The method of claim 1 wherein the connecting step comprises routing communications between the secured connection and the connection established between the second one of the customer premise equipment and the encryption and decryption apparatus.

6. The method of claim 1 further comprising the step of establishing a connection to the encryption and decryption apparatus using a default number associated with the encryption and decryption apparatus.

7. The method of claim 6 further comprising the step of storing the default number in a data memory.

8. The method of claim 1 wherein:

the step of establishing the connection between a second one of the customer premise equipment and the encryption and decryption apparatus further comprises the step of initiating a telephone call using a first telephone number associated with a subscriber; and the step of establishing the secured connection further comprises the step of mapping the first telephone number to a second telephone number and initiating a telephone call to the subscriber using the second telephone number.

* * * * *